H. SCHMALLAND.
MEANS FOR PACKING INCANDESCENT MANTLES.
APPLICATION FILED NOV. 9, 1908.
955,361.
Patented Apr. 19, 1910.
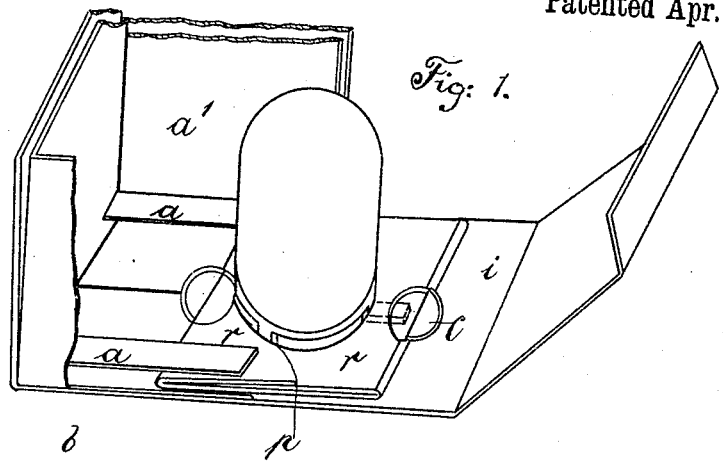
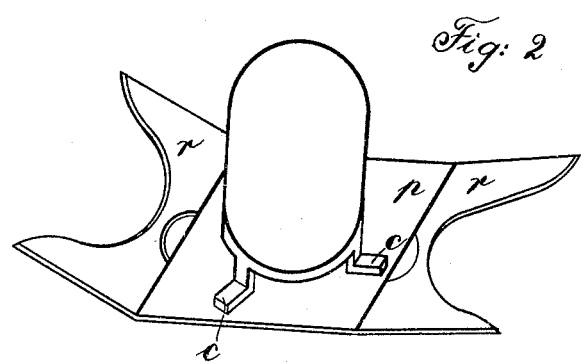
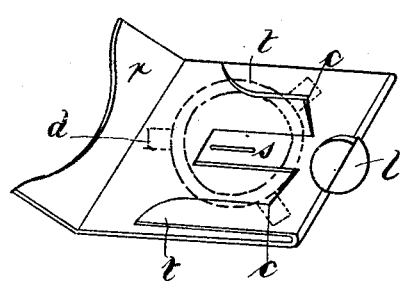
Witnesses
R. Isrelstein
E. Schallinger
Inventor
Hans Schmalland
By B. Singer
Atty

UNITED STATES PATENT OFFICE.

HANS SCHMALLAND, OF STEGLITZ, NEAR BERLIN, GERMANY, ASSIGNOR TO DEUTSCHE GASGLUHLICHT AKTIEN GESELLSCHAFT, OF BERLIN, GERMANY.

MEANS FOR PACKING INCANDESCENT MANTLES.

955,361.  Specification of Letters Patent.  Patented Apr. 19, 1910.

Application filed November 9, 1908. Serial No. 461,811.

*To all whom it may concern:*

Be it known that I, HANS SCHMALLAND, merchant, a subject of the German Emperor, residing at Schutzenstrasse 2, Steglitz, near Berlin, in the German Empire, have invented certain new and useful Improvements in Means for Packing Incandescent Mantles, (for which I have applied for a patent in Germany, and which application is dated November 27, 1907, No. D.19,295, XI 81c, and in England, No. 27,710 of 1907, dated December 16, 1907,) of which the following is a specification.

This invention relates to means for packing incandescent mantles more particularly those for inverted lights which are usually sold attached to a mantle ring. Its object is so to construct the devices in question that the mantle will be held securely and when put into or taken out of its box will not touch the sides of the latter and will be protected against injury at all times.

The said invention is illustrated in the accompanying drawings in which:

Figure 1 shows the whole device with a mantle in place parts of the box portion being removed. Fig. 2 shows one form of carrier employed in accordance with this invention, and Fig. 3 shows a modified carrier.

As will be seen in the drawings a box say square in shape is provided, $a'$ is one of the sides of the box, $b$ is the bottom of the box and $a, a$, are two ledges or narrow strips fixed to the sides of the box at a suitable distance from the bottom of the latter. Said strips $a, a$, serve to hold when inserted the carrier hereinafter described.

It will be seen that the carrier consists of a central portion upon which the mantle rests and wing pieces which fold over and bear upon the clips on the mantle ring so that when the carrier is pushed into the box the strips $a$ $a$ hold down the wing pieces upon the clips and thereby retain the mantle in place. The wing pieces being cut out centrally prevent shifting of the mantle and keep it properly centered.

Two forms of carrier are shown which however do not materially differ from one another.

The form shown in Fig. 2 consists of the central portion $p$ and the wing pieces $r$, the latter being cut to shape so as to embrace the mantle and cover the studs $c, c$, of the mantle ring. When folded down as shown in Fig. 1 they will just fill the space between the strips $a$ and the bottom $b$ of the box permitting the strips $a$ to press upon them with a sufficient force to retain the carrier securely in place and hence to hold the mantle. Thumb pieces $e, e$, may be cut out to facilitate handling. Their operation is too obvious to need description.

In the modification shown in Fig. 3 one of the wing pieces $r$ is substantially similar to the corresponding wing piece shown in Fig. 2. The other wing piece $r'$ has lengthened extensions $t, t$, and is at $s$ provided with a tongue projecting forward parallel with the parts $t, t$. The tongue $s$ is fixed to the central portion at $s'$ say by a wire staple. When the lugs $c, c$, Fig. 3 are pushed under the extensions $t, t$, the resilience of the parts $t, t$, will hold the same and prevent the mantle falling off accidentally. The remaining lug $d$ will be held by the wing $r$, Fig. 3 when the carrier is pushed under the strips $a, a$.

The box in any case has a falling front $i$ to give ready access to the mantle when the box is open.

Claims.

1. Means for packing incandescent mantles, comprising an inclosing box having opposite strips arranged internally at a suitable distance from one of its walls, and a carrier consisting of a flat central portion and wing pieces constructed to fold toward one another and over said central portion so as to hold the lugs of a mantle ring thereagainst, the carrier in its folded condition fitting between said strips and said wall.

2. In combination, a mantle box having a falling front and having retaining strips arranged interiorly above the bottom of the box, and a carrier consisting of a flat central portion and opposite wings constructed to fit around the mantle and to fold toward one another so as to cover and hold the lugs of a mantle ring, said carrier being provided with thumb pieces and in its folded condition fitting between said retaining strips and the bottom of the box.

3. In combination, a mantle box having a falling front and retaining strips arranged interiorly, and a carrier consisting of a flat central portion and opposite wings folded toward each other over said central portion and constructed to embrace and cover the lugs of a mantle ring, one of said wings having an extension which is secured to said central portion, and said carrier fitting between said retaining strips and one of the walls of the box.

In testimony whereof I have hereunto set my hand in presence of two subscribing witnesses this 26th day of October, 1908.

HANS SCHMALLAND.

Witnesses:
 WOLDEMAR HAUPT,
 HENRY HASPER.